(12) United States Patent
Jin

(10) Patent No.: US 6,321,460 B1
(45) Date of Patent: Nov. 27, 2001

(54) DRYING APPARATUS

(76) Inventor: Keum Su Jin, Room 401 Jupung Village, 316-8, Kil-Dong, Kangdong-Ku, Seoul (KR)

( * ) Notice: Subject to any disclaimer, the term of this patent is extended or adjusted under 35 U.S.C. 154(b) by 0 days.

(21) Appl. No.: 09/635,323

(22) Filed: Aug. 9, 2000

(30) Foreign Application Priority Data

Dec. 23, 1999 (KR) .................................................. 99-61434

(51) Int. Cl.$^7$ ............................. F26B 21/04; F26B 21/08
(52) U.S. Cl. ................................... 34/77; 34/215; 34/219
(58) Field of Search ................................. 34/61, 77, 204, 34/209, 210, 212, 215, 219, 220; 62/238.6, 238.7, 119, 165

(56) References Cited

U.S. PATENT DOCUMENTS

| | | | |
|---|---|---|---|
| 4,196,526 | * | 4/1980 | Berti .......................................... 34/77 |
| 5,119,571 | * | 6/1992 | Beasley ...................................... 34/26 |
| 5,343,632 | * | 9/1994 | Dihn ........................................ 34/507 |
| 5,675,906 | * | 10/1997 | Li et al. ..................................... 34/77 |
| 5,680,711 | * | 10/1997 | Moratalla .................................. 34/77 |
| 5,940,983 | * | 8/1999 | Lu ........................................... 34/212 |

* cited by examiner

Primary Examiner—Henry Bennett
Assistant Examiner—Greg T. Warder
(74) Attorney, Agent, or Firm—Hedman & Costigan, P.C.

(57) ABSTRACT

A drying apparatus is disclosed. The drying apparatus comprises a drying housing, a heat pump unit and a heat pump piping. The interior of the drying housing is divided into a drying chamber and a circulation passage by a partition wall. The circulation passage is divided into upper and lower passages by a partition plate. Dampers are respectively mounted on the partition plate and the upper and lower portions of the outside wall of the circulation passage, and a heated air inlet and an air outlet are respectively formed on the upper and lower portions of the partition wall. The heat pump unit is disposed with its condenser situated in the heated air inlet and its evaporator situated in the atmosphere. The heat piping is disposed with its condensing portion situated in front of the sucking side of the evaporator and its evaporating portion situated in front of the heated air outlet in the drying chamber.

2 Claims, 3 Drawing Sheets

DRYING APPARATUS

BACKGROUND OF THE INVENTION

1. Field of the Invention

The present invention relates, in general, to a drying apparatus and, more particularly, to a drying apparatus using a heat pump unit.

2. Description of the Prior Art

As well known to those skilled in the art, a drying apparatus has been used to easily store and transport agricultural products, marine products, livestock products or the like. As a heat source for the drying apparatus, fossil fuel, electricity, solar heat, ambient air or the like has been utilized.

A heat pump unit is a device that utilizes the ambient air as a heat source and operates a refrigeration cycle in a reverse manner. Since the heat pump unit employs the ambient air as a heat source, the evaporating efficiency of the coolant of its evaporator is in proportion to the temperature of the ambient air during the operation of the drying apparatus. Accordingly, the heat capacity of the heat pump unit is insufficient when the temperature of the ambient air is low. Many attempts have been made to overcome such a problem.

As an example, Japanese Utility Model Publication No. Sho 49-18927 discloses an air conditioning apparatus in which an outdoor heat exchanger and two indoor heat exchangers are disposed in a coolant cycle. This air conditioning apparatus is operated in such a way that during a room cooling operation, one of the indoor heat exchangers is utilized as an evaporator and the remaining one is shut to cool indoor air, while during a room heating operation, the outdoor heat exchanger is utilized as an evaporator and simultaneously the two indoor heat exchangers are all utilized as condensers to heat indoor air. Japanese Unexamined Patent Publication No. Sho 54-45949 discloses an air conditioning apparatus in which a coolant heater is disposed in a room heating cycle. The coolant heater is utilized as an evaporator only during a room heating operation, so that coolant liquid is forcibly evaporated in the coolant heater after high temperature and high pressure coolant gas compressed in a compressor is condensed and liquefied into the coolant liquid in an indoor heat exchanger to heat the room.

However, with regard to the former air conditioning apparatus, since the compressor must be utilized when indoor air is heated in the two indoor heat exchangers that function as condensers, the capacity of the compressor must be large, thereby increasing its manufacturing and maintenance costs. In addition, since two indoor heat exchangers must be mounted in the interior of a room, a large portion of the room is occupied by the air conditioning apparatus, thereby limiting the utilization of the interior of the room. Furthermore, since frost is deposited on the outdoor heat exchanger when the temperature of the ambient air is low during a room heating operation, the heat transmitting efficiency of the outdoor heat exchange is reduced, thereby reducing the evaporating efficiency of the coolant and, accordingly, causing the capacity of the air conditioning apparatus to be insufficient.

With regard to the latter air conditioning apparatus, it is described that the coolant is forcibly evaporated in the coolant heater, so its cooling capacity is not reduced and the defrosting of the outdoor heat exchanger is not necessary. However, since the construction of the coolant heater is not disclosed in the Publication, it is assumed that the coolant heater heats coolant using electric heat that allows the coolant heater to be small and to be easily mounted, thereby increasing the maintenance cost of the air conditioning apparatus.

SUMMARY OF THE INVENTION

Accordingly, the present invention has been made keeping in mind the above problems occurring in the prior art, and an object of the present invention is to provide a drying apparatus that has a simple construction and prevents its drying performance from being deteriorated even when the temperature of ambient air is low.

In order to accomplish the above object, the present invention provides a drying apparatus, comprising: a drying housing, the interior of which is divided into a drying chamber and a circulation passage by a partition wall, the circulation passage being divided into upper and lower passages by a partition plate, the drying housing being provided with dampers respectively mounted on the partition plate and the upper and lower portions of the outside wall of the circulation passage and a heated air inlet and an air outlet respectively formed on the upper and lower portions of the partition wall; a heat pump unit disposed with its condenser situated in the heated air inlet and its evaporator situated in the atmosphere; and a heat piping disposed with its condensing portion situated in front of the sucking side of the evaporator and its evaporating portion situated in front of the heated air outlet in the drying chamber.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
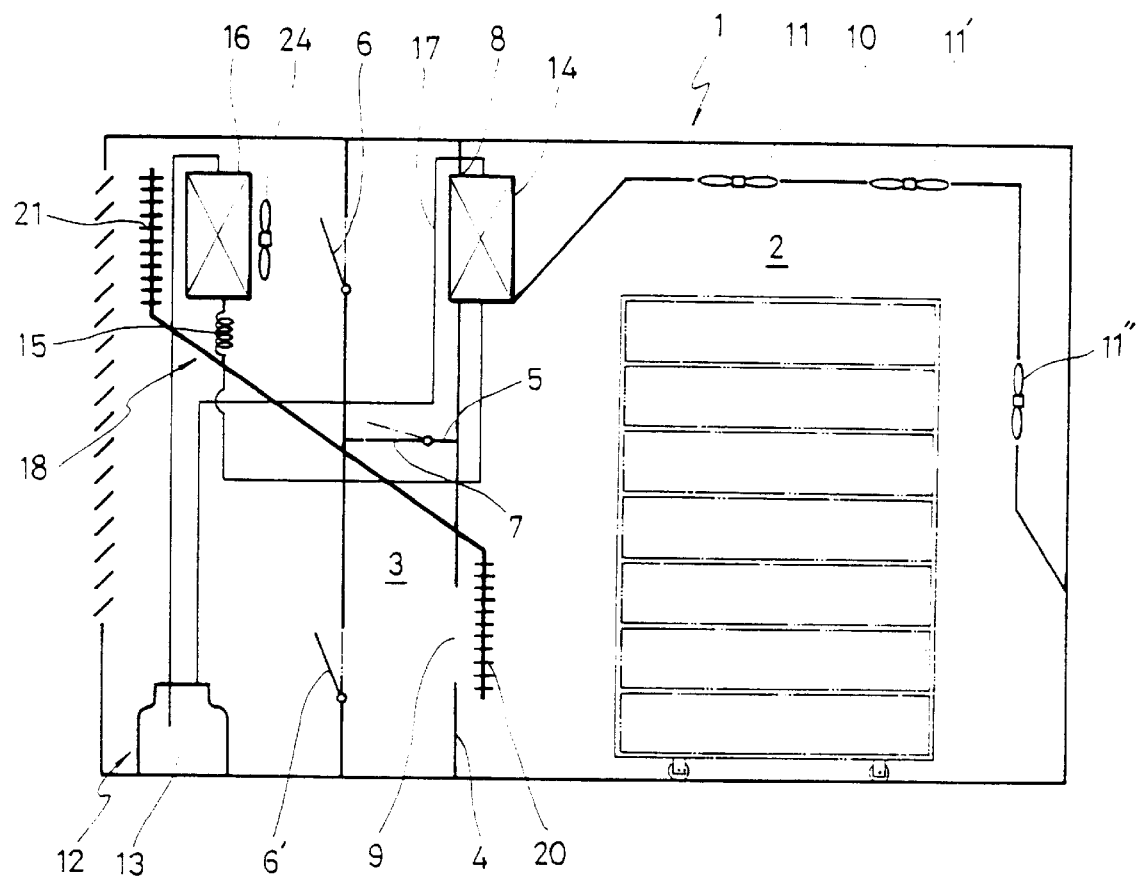
FIG. 1 is a sectional elevation showing a drying apparatus in accordance with a first embodiment of the present invention.

Reference now should be made to the drawings, in which the same reference numerals are used throughout the different drawings to designate the same or similar components.

Figure 2:
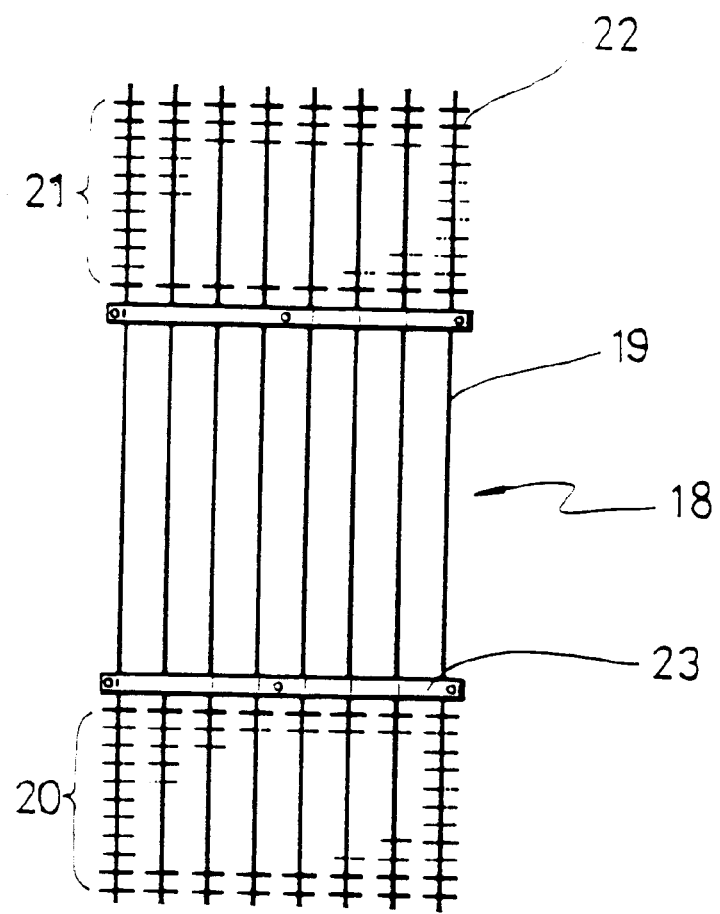
FIG. 2 is a view showing the piping of the drying apparatus in accordance with the first embodiment.

FIG. 1 is a sectional elevation showing a drying apparatus in accordance with a first embodiment of the present invention. FIG. 2 is a view showing the heat piping of the drying apparatus in accordance with the first embodiment.

As illustrated in FIG. 1, reference numeral 1 designates a drying housing. The interior of drying housing 1 is divided into a drying chamber 2 and a circulation passage 3 by means of a partition wall 4. The circulation passage 3 is divided into upper and lower portions by means of a partition plate 5. Three dampers 6, 6' and 7 are respectively disposed on the partition plate 5 and the upper and lower portions of the outside wall of the circulation passage 3. A heated air inlet 8 and a heated air outlet 9 are respectively formed on the upper and lower portions of the partition wall 4. A heated air supply duct 10 is formed on the upper and side portions of the drying chamber 2 to communicate with the heated air inlet 8. A plurality of fans 11, 11' and 11" are mounted on the inside wall of the heated air supply duct 10. A door (not shown) is positioned on the inside wall of the drying chamber 2.

A heat pump unit 12 is fabricated by connecting a compressor 13, a condenser 14, a pressure reducer 15, an evaporator 16 and the compressor 13 one after another by means of a conduit 17, exposing the compressor 13 and the evaporator 16 to the atmosphere and disposing the condenser 14 in the heated air inlet 8.

A heat piping 18 comprises a plurality of heat pipes 19 arranged parallel to one another by means of two fixing bars 23 and filled with working fluid, such as distilled water, alcohol, liquid ammonia or the like. The lower and upper portions of the heat piping 18 respectively constitute an evaporating portion 20 and a condensing portion 21. A plurality of valves (not shown) are disposed on the heat pipes 19 under the condensing portion 21. A plurality of heat dissipating fins 22 are regularly arranged on the evaporating portion 20 and the condensing portion 21. The heat piping 18 is positioned in the drying housing 1, with the evaporating portion 20 is situated in front of the heated air outlet 9 in the drying chamber 2 and the condensing portion 21 in front of the sucking side of the evaporator 16.

Although the heat piping 18 has been described to be constructed of linear heat pipes 19, the heat piping 18 is not limited to this construction and may be constructed of looped heat pipes. Additionally, although the condensing portion 21 of the heat piping 18 is situated in front of a single sucking side of the evaporator 16, the condensing portion 21 of the heat piping 18 may be situated in front of three sucking sides of the evaporator 16. Reference numeral 24 designates a suction fan for the evaporator 16.

In the drying apparatus in accordance with the first embodiment of the present invention, the compressor 13 is operated while articles desired to be dried are positioned in the drying chamber 2, the dampers 6 and 6' are closed, the damper 7 is opened and the valves in the heat pipes 19 are closed. When the compressor 13 is operated in such a state, high-pressure and high temperature coolant gas compressed in the compressor 13 is condensed and liquefied in the condenser 14 and dissipates condensation heat to air. The air heated by the condensation heat is supplied to the drying chamber 2 through the heated air supply passage 10 by means of the fans 11, 11' and 11", dries the articles positioned in the drying chamber 2, and, thereafter, is returned toward the condenser 14 through the heated air outlet 9 of the partition wall 4 and the circulation passage 3.

In the meantime, the coolant condensed and liquefied in the condenser 14 is reduced in its pressure in the pressure reducer 15, is evaporated and gasified using the atmospheric air as a heat source in the evaporator 16 and, subsequently, flows into the compressor 13, thus forming a cycle. During this process, the heat piping 18 is not functioning.

In the heat pump unit, since the evaporation efficiency of the coolant in the evaporator 16 is in proportion to the temperature of the ambient air, the drying apparatus runs short of the drying capacity when the temperature of the ambient air is low. In accordance with the first embodiment of the present invention, when the drying apparatus runs short of the drying capacity, the heat piping 18 is allowed to function by the opening of the valves disposed in the heat pipes 19. While the heat piping 18 functions, there is reiterated a cycle in which the working fluid in the evaporating portion 20 of the heat piping 18 is heated and evaporated by the heated air discharged through the heated air outlet 9 of the drying chamber 2, the evaporated working fluid ascends to and is condensed in the condensing portion 21 of the heat piping 18, and the condensed working fluid descends to the evaporating portion 21. Meanwhile, air, which is heated by condensation heat generated in the condensing portion 21, is caused to pass around the evaporator 16 by means of the suction fan 24, and the heated air promotes the evaporation of coolant in the evaporator 16. As a result, the drying capacity of the drying apparatus is not deteriorated, when the temperature of the ambient air is low, and the evaporation efficiency of the evaporator 16 becomes superior because frost is not deposited on the outer surface of the evaporator 16.

In the process of drying the articles positioned in the drying chamber 2, humidity is evaporated from the articles and is included in the heated air. At this time, the damper 7 is allowed to be closed, whereas the dampers 6 and 6' are allowed to be opened. Accordingly, heated air including a great deal of humidity and being discharged through the heated air outlet 9 is dehumidified by means of contact with the ambient air, the ambient air is preheated by the condensing portion 21 of the heat piping 18 and is dehumidified by means of the evaporator 16, and the heated and the dehumidified ambient air is sucked into the drying chamber 2 together with the dehumidified and heated air, thereby improving the drying efficiency of the drying apparatus.

Figure 3:
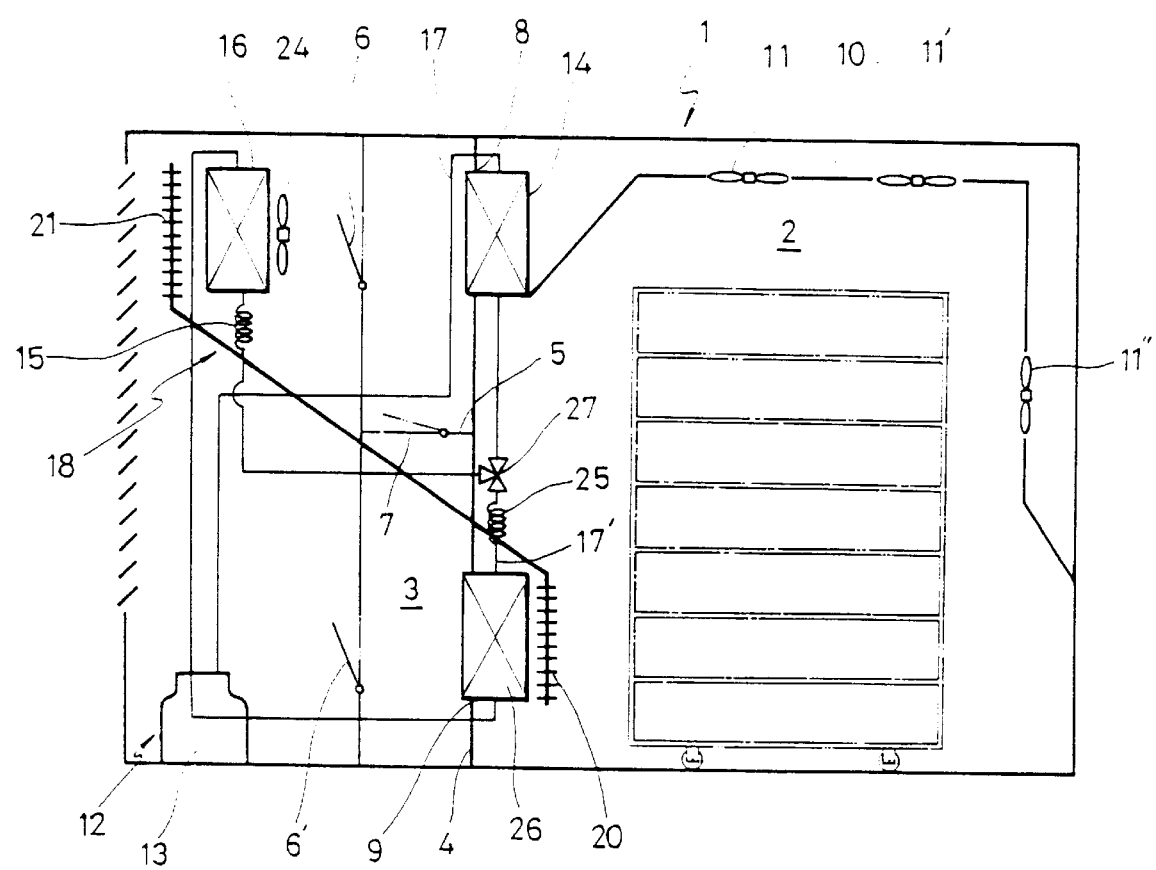
FIG. 3 is a sectional elevation showing a drying apparatus in accordance with a second embodiment of the present invention.

FIG. 3 is a sectional elevation showing a drying apparatus in accordance with a second embodiment of the present invention. The same reference numerals are used to designate the same components in FIGS. 1 and 3, and the description of the same components is omitted. The drying apparatus of the second embodiment is different from the drying apparatus of the first embodiment in that a point on the portion of the conduit 17 directly connecting the condenser 14 to the evaporator 16 is connected to the compressor 13 by means of a conduit 17', a second pressure reducer 25 and a combined evaporator and dehumidifier 26 are disposed on the conduit 17' and a three-way valve 27 is disposed at a position where one end of the conduit 17' is connected to the conduit 17.

If the combined evaporator and dehumidifier 26 is stopped and the compressor 13 is operated while the dampers 6 and 6' are closed, the damper 7 is opened and the three-way valve 27 is manipulated to allow coolant to flow through the conduit 17, high temperature and high pressure coolant gas compressed in the compressor 13 dries articles while performing the same operation as that of the first embodiment. In this case, the operation of the heat piping is stopped.

If the drying operation is performed in rainy weather or in a case where a great deal of humidity is included in the heated air, the three-way valve 27 is manipulated to allow the coolant liquid to flow through the conduit 17', the operation of the evaporator 16 is stopped and heated air including a great deal of humidity is allowed to pass through the combined evaporator and dehumidifier 26. As a result, the evaporation efficiency of the coolant is kept superior because the coolant liquid is evaporated by the heated air, and the drying efficiency of the apparatus is kept superior because the heated air is dehumidified and the heated air is not exhausted to the atmosphere.

When articles including a great deal of humidity are dried, the damper 7 is closed and the dampers 6 and 6' are opened while the combined evaporator and dehumidifier 26 is operated, thereby dehumidifying heated air including humidity by the atmosphere. At the same time, the ambient air is allowed to pass around the condensing portion 21 the heat piping 18 and evaporator 16 by means of the suction fan 24 to preheat and dehumidify the ambient air while the beat piping 18 is operated and, thereafter, is sucked into the condenser 14 together with the heated air dehumidified by the atmosphere, thereby maintaining superior dehumidifying and drying efficiency.

As described above, in accordance with the present invention, condensation heat can be supplied to the evaporator together with the heat of the atmosphere because the condensing portion of the heat piping is situated in front of the sucking side of the evaporator and the evaporating portion of the heat piping is situated in front of the heated air outlet in the drying chamber while articles desired to be dried are dried using the heat pump unit. As a result, superior drying efficiency can be maintained because the coolant liquid is evaporated sufficiently without an additional heat source when the temperature of the ambient air is low, superior evaporating efficiency can be maintained because the combined evaporator and dehumidifier is disposed in the heated air outlet 9 of the drying chamber 2, and superior drying efficiency can be maintained because the heated air is not exhausted to the atmosphere during a dehumidifying operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A drying apparatus, comprising:
   a drying housing, an interior of which is divided into a drying chamber and a circulation passage by a partition wall, said circulation passage being divided into upper and lower passages by a partition plate, said drying housing being provided with dampers respectively mounted on the partition plate and upper and lower portions of an outside wall of the circulation passage and a heated air inlet and an air outlet respectively formed on upper and lower portions of the partition wall;
   a heat pump unit disposed with its condenser situated in the heated air inlet and its evaporator situated in the atmosphere; and
   a heat piping disposed with its condensing portion situated in front of a sucking side of the evaporator and its evaporating portion situated in front of the heated air outlet in the drying chamber.

2. A drying apparatus, comprising:
   a drying housing, an interior of which is divided into a drying chamber and a circulation passage by a partition wall, said circulation passage being divided into upper and lower passages by a partition plate, said drying housing being provided with dampers respectively mounted on the partition plate and upper and lower portions of an outside wall of the circulation passage and heated air inlet and outlet respectively formed on upper and lower portions of the partition wall;
   a heat pump unit disposed with its condenser situated in the heated air inlet and its evaporator situated in the atmosphere;
   a heat piping being disposed with its condensing portion situated in front of a sucking side of the evaporator and its evaporating portion situated in front of the heated air outlet in the dyring chamber; and
   a combined evaporator and dehumidifier branched off from a point between the condenser and evaporator and disposed in the heated air outlet.

* * * * *